(12) United States Patent
Ragnet et al.

(10) Patent No.: US 7,576,883 B2
(45) Date of Patent: Aug. 18, 2009

(54) SECURE PRINTING VIA A WIRELESS INTERNET SERVICE

(75) Inventors: Francois Ragnet, Venon (FR); Victor Ciriza, La Tour du Pin (FR); David L. Salgado, Victor, NY (US); Pascal Valobra, Meylan (FR)

(73) Assignee: Xerox Corporation, Norwalk, CT (US)

( * ) Notice: Subject to any disclaimer, the term of this patent is extended or adjusted under 35 U.S.C. 154(b) by 811 days.

(21) Appl. No.: 11/347,871

(22) Filed: Feb. 6, 2006

(65) Prior Publication Data

US 2007/0182984 A1  Aug. 9, 2007

(51) Int. Cl.
G06F 3/12 (2006.01)
G06K 15/00 (2006.01)

(52) U.S. Cl. ............... 358/1.15; 358/1.13; 358/1.14

(58) Field of Classification Search ......... 358/1.15, 358/1.14, 1.13, 1.1, 1.16, 1.17, 1.18, 1.9, 358/407, 468, 437, 1.2, 1.4, 1.6, 1.11, 400, 358/403, 434, 435, 436, 438, 439, 450; 399/1, 399/8; 713/150, 182, 189; 380/201, 243, 380/244, 245, 246, 247, 248, 249, 250, 255, 380/270, 55; 382/303, 304, 305, 284, 180; 710/15, 18; 347/2, 3, 5, 14, 23; 715/234, 715/237, 239, 276, 277; 705/400
See application file for complete search history.

(56) References Cited

U.S. PATENT DOCUMENTS

| 6,378,070 B1 | 4/2002 | Chan et al. |
| 2004/0172586 A1 | 9/2004 | Ragnet et al. |
| 2005/0138065 A1 | 6/2005 | Ciriza |
| 2006/0136726 A1* | 6/2006 | Ragnet et al. ............... 713/171 |

OTHER PUBLICATIONS

Balfanz et al., "Network-in-a-Box: How to Set Up a Secure ...", Palo Alto Research Center Incorporated, USENIX Association, 17 pp., 2004.
"The PKI page," Public Key Infrastructure (PKI), pp. 1-18, at http://www.pki-page.org/, last visited Dec. 6, 2005.
Brochure for JetCAPS SecureJet 4.1, Hewlett-Packard Company and JetCAPS Europe Labs, 2 pp., May 26, 2003.
SecureJet White paper, Hewlett-Packard Corp., SecureJet—43c/4.5 White Paper, pp. 1-28, Edition 3, Mar. 2005.
"hp jetcaps printing solutions guide," Hewlett-Packard, pp. 1-26, 2000.

* cited by examiner

*Primary Examiner*—Dov Popovici
(74) *Attorney, Agent, or Firm*—Fay Sharpe LLP

(57) ABSTRACT

At a user terminal (10) operatively connected with a mobile device (20), a print job is formed into an incomplete print job envelope (32) and completing data (34, 40) including at least print job accounting information (40). The completing data (34, 40) including at least the print job accounting information (40) is stored on the mobile device (20). The incomplete print job envelope (32) is transmitted to a printing device (12). The mobile device (20) is operatively disconnected the from the user terminal (10), and is operatively connected with the printing device (12). After the operative connecting, the print job is re-constructed at the printing device (12), and the re-constructed print job is printed using the printing device (12). A cost of the printing is accounted for based on the print job accounting information (40) stored on the operatively connected mobile device (20).

25 Claims, 6 Drawing Sheets

PRINT QUEUE FOR JOHN J. SMITH

PLEASE SELECT A FILE TO PRINT:

| | |
|---|---|
| DEC_PRESENTATION.PPT | CREATED: 05-DEC. 2005 |
| CONF_PAPER.DOC | CREATED: 03-DEC. 2005 |
| FUNDING_2005.XLS | CREATED: 18-NOV. 2005 |

*FIG. 6*

SECURE PRINTING VIA A WIRELESS INTERNET SERVICE

BACKGROUND

The following relates to the printing and sheet marking arts. It is described with example illustrated reference to methods and apparatuses for securing and accounting for print jobs sent via a wireless Internet service to a printing system. However, the following is amenable to other like applications.

Wireless Internet services are becoming increasingly prevalent. For example, 802.11-compliant WiFi-based wireless hotspots provide wireless Internet access to the public for free or on a fee basis. WiFi hotspots are typically at airports, hotels, cafes, and so forth. It is contemplated for whole cities and major metropolitan areas to-be covered by networks of wireless hotspots to provide ubiquitous wireless Internet service. Some cellular telephone companies are also entering the wireless Internet provider market with broadband wireless Internet access having wide geographical coverage and typically available on a contractual basis, for example by purchasing a two-year service contract payable in monthly installments providing the customer with unlimited broadband wireless Internet access. Publicly accessible wireless local area network (WLAN) systems with Internet connectivity are also known. In conjunction with the growth of wireless Internet services, most laptop computers sold today provide an 802.11-compliant or other wireless network card as standard equipment, enabling most laptop computer users to access the available wireless Internet services.

Users of a wireless Internet service can perform a wide variety of tasks, such as accessing email through a webmail server, browsing and interacting with sites on the world-wide web, transferring files (such as word processing files, digital images, and so forth), engaging in on-line shopping, downloading or streaming music or audio-video, and so forth. Many of these services are free, or are pre-paid, or are readily paid for at time-of-purchase or time-of-use through the use of credit cards, debit cards, or Internet pre-pay services such as PayPal®.

The user may also want to print via a wireless Internet service. To do so, the user knows of or locates an Internet-accessible printing device, and sends his or her print job to that printing device via the wireless Internet service. When the print job arrives, it is printed, and the user later visits the location of the printing device to pick up the print job, or alternatively the printed sheets are mailed, couriered, or otherwise delivered from the printing device to a pick-up location selected by the user who initiated the print job.

However, difficulties arise when attempting to perform printing via a wireless Internet service. The user typically must be authorized to print on the printing device. Obtaining such authorization typically involves transfer of money or its equivalent (such as a credit card transaction) from the user to the owner of the printing device. This is generally so because the cost of printing is substantial (including, for example, cost of paper, cost of toner usage, amortized cost of replacement of worn mechanical parts, and so forth) so that the owner of the printing device is unlikely to allow general use of the device for free.

One approach for accounting for the cost of printing is to employ a contractual arrangement between the user and the owner of the printing device. However, such a long-term contract is typically not satisfactory, since the user is then limited to printing at the one or few printing systems owned or controlled by the contracted owner. Such a limitation is contrary to the desired mobile freedom of wireless Internet. For example, if the user is a frequent traveler, he or she will want to be able to print in whatever city or country he or she happens to be in at any given time. Moreover, a contract allowing unlimited printing leaves the owner of the printing device open to losses due to excessive printing by the user.

Instead of or in addition to a long-term contract, another contemplated approach is a per-page or other usage-based fee charged at the time-of-purchase. For example, the user may pay for 100 printed pages using a credit card, debit card, PayPal®, or so forth at the time the print job is submitted. However, if the print job or a portion thereof fails for any reason (which is not uncommon considering the mechanical processes involved in printing, the possibility of running out of paper, toner, ink, or other printing consumables, or so forth) then the user must attempt to get a monetary refund for those sheets that did not print properly. This can be difficult if the user is on travel and will soon be leaving the locality of the printing system. Moreover, existing payment at time-of-purchase arrangements are susceptible to fraud or honest disputes. For example, a dishonest user may claim the print job failed when it actually printed, or an honest user may believe that a print job failed when in fact it executed properly but was inadvertently picked up by another user. In the latter case, it is unclear as between the user and the printing system owner who should be liable for the cost of the lost or misplaced printed sheets.

Other difficulties with attempting to perform printing via a wireless Internet service include inconvenience and security concerns. The Internet-accessible printing system typically receives print jobs via the Internet, and prints them in the order of receipt, unless an alternative priority is provided. The user arrives some time after the print job has executed, and must go through a stack or other collection of print jobs to locate the user's print job. During the time between printing and user pick-up, the printed pages are accessible to others, presenting a security risk. Yet another difficulty is identifying available printing resources at a given, unknown hotspot. For example, the user working at an airport while waiting for a flight may be unaware of what, if any, public printing resources are available at the airport.

CROSS REFERENCE TO RELATED PATENTS AND APPLICATIONS

The following U.S. patent applications are commonly assigned with the present application, and are incorporated herein by reference:

Ragnet et al., "Method and Apparatus for Controlling Document Service Requests from a Mobile Device," U.S. patent application Ser. No. 10/605,874 filed 3 Nov. 2003, published as US 2004/0172586 A1 on Sep. 2, 2004, and relating generally at least to aspects of interaction between a mobile device and a wirelessly-equipped printing device, is incorporated by reference herein in its entirety;

Ragnet et al., "Multifunction Device with Secure Job Release," U.S. patent application Ser. No. 11/013,323 filed 14 Dec. 2004 relating generally at least to aspects of secure printing employing wireless mobile devices, is incorporated by reference herein in its entirety;

Ciriza et al., "Mobile Device-Enabled Secure Release of Print Jobs," U.S. patent application Ser. No. 11/348,423, filed Feb. 6, 2006 and relating generally at least to aspects of secure printing using a mobile device, is incorporated by reference herein in its entirety; and Ciriza et al., "Mobile Device-Enabled Secure Release of Print Jobs Using Parallel Decryption," U.S. patent application Ser. No. 11/348,422, filed Feb. 6, 2006 and relating generally at least to aspects of secure printing employing wireless mobile devices, is incorporated by reference herein in its entirety.

BRIEF DESCRIPTION

According to certain aspects illustrated herein, there is disclosed a printing method. At a user terminal operatively connected with a mobile device, a print job is formed into an incomplete print job envelope and completing data including at least print job accounting information. The completing data including at least the print job accounting information is stored on the mobile device. The incomplete print job envelope is transmitted to a printing device. The mobile device is operatively disconnected from the user terminal, and is operatively connected with the printing device. After the operative connecting, the print job is re-constructed at the printing device, and the re-constructed print job is printed using the printing device. A cost of the printing is accounted for based on the print job accounting information stored on the operatively connected mobile device.

According to certain aspects illustrated herein, there is disclosed a printing system comprising: a printing device including a network connection operatively connected with a digital network and a mobile device interface for operatively connecting a mobile device including non volatile storage; a print job reconstructor that reconstructs a print job from an incomplete print job envelope responsive to receiving completing data including at least print job accounting information via the mobile device interface, the reconstructed print job being executed by the printing device; and a printing device accountant that accounts for a cost of printing the reconstructed print job based at least on the print job accounting information.

According to certain aspects illustrated herein, there is disclosed a print job generator comprising: a user terminal operatively connectable with a digital network and operatively connectable with a mobile device; a print driver comprising instructions to generate page description language (PDL) data corresponding to a print job; an envelope generator comprising instructions to decompose the PDL data into an incomplete print job envelope sent to a printing device via the digital network and completing data that is stored on the mobile device, the incomplete print job envelope and completing data being configured to enable reconstruction of the PDL data at the printing device responsive to the mobile device on which the completing data is stored being operatively connected with the printing device; and a print job accounting information generator comprising instructions to generate print job accounting information including at least an identity of a user account and authorization to access the user account, the print job accounting information being stored on the mobile device, the printing device accounting for a cost of printing the print job based on the print job accounting information stored on the mobile device.

BRIEF DESCRIPTION OF THE DRAWINGS

FIG. 6 shows a suitable display screen of a touch-sensitive LCD display of the printing device of FIGS. 1 and 3 for enabling user selection of a print job from print jobs queued on the mobile device.

DETAILED DESCRIPTION

Figure 1:
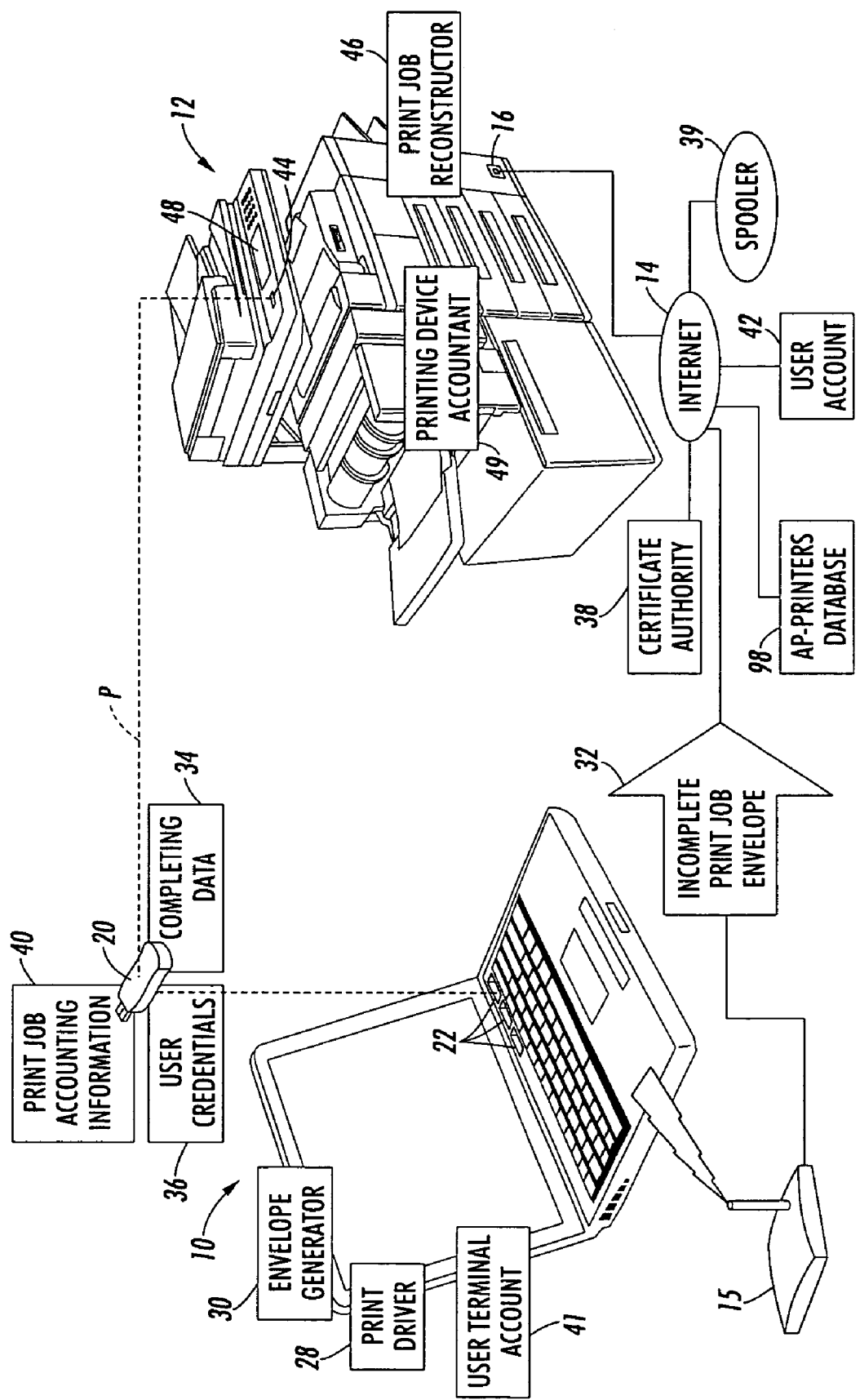
FIG. 1 diagrammatically shows a user terminal with wireless Internet access and a printing device accessible via the Internet for executing print jobs generated at the user terminal.
Figure 2:
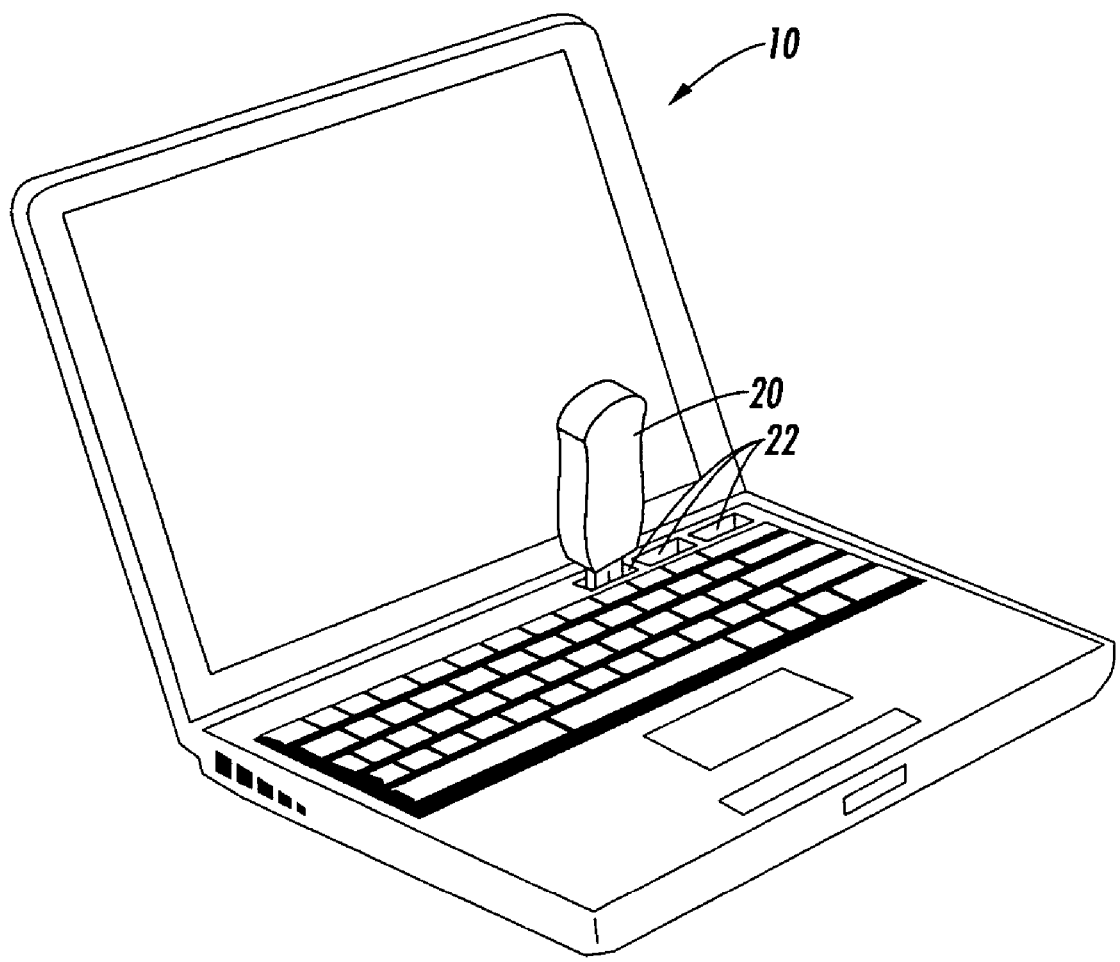
FIG. 2 shows the user terminal of FIG. 1 during generation of the print job, with the USB drive mobile device operatively connected with the user terminal.
Figure 3:
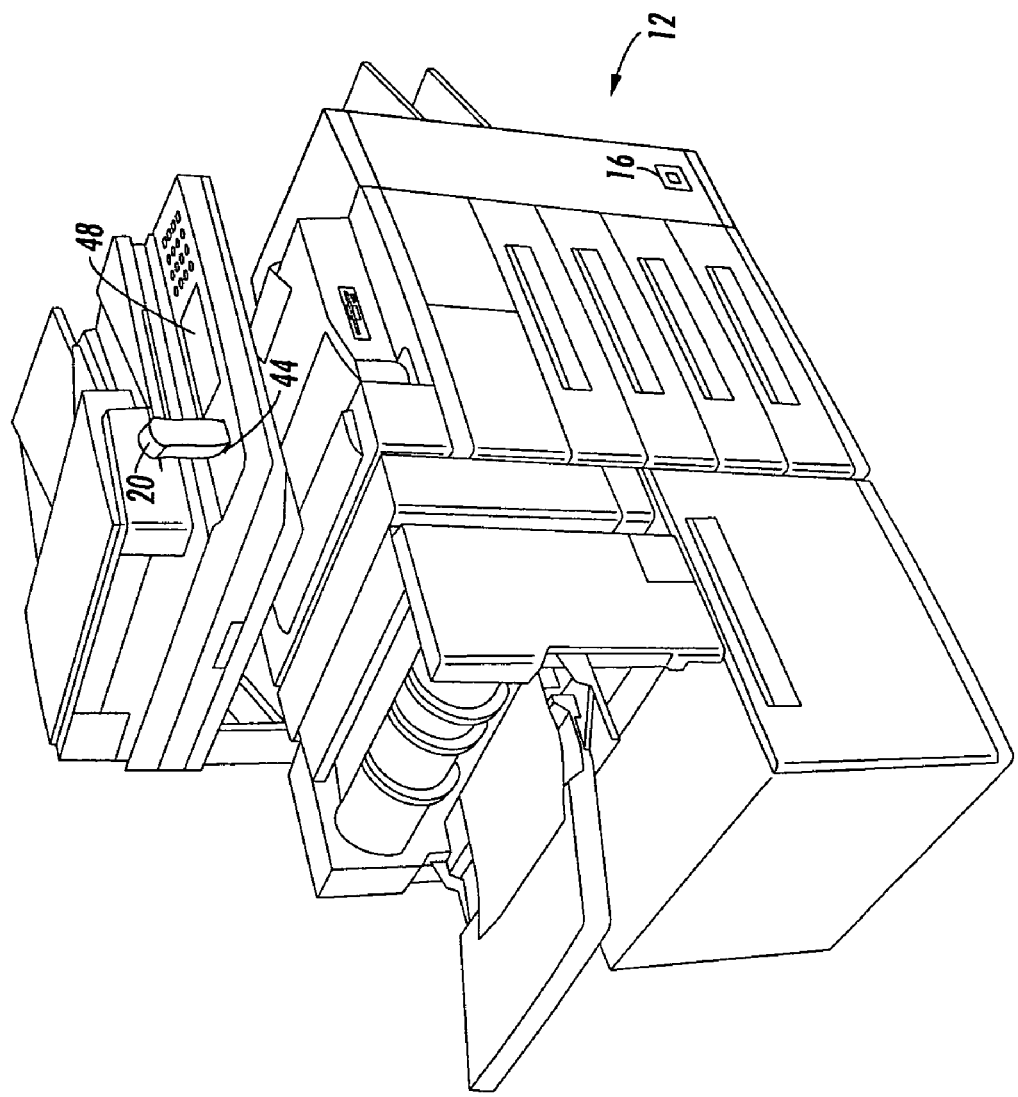
FIG. 3 shows the printing system of FIG. 1 during printing, with the USB drive mobile device operatively connected with the printing system.

With reference to FIG. 1-3, a user terminal 10 enables an employee, professional person, business person, or other user to create, edit, or otherwise prepare or generate a document, such as a word processing document, spreadsheet document, slide show presentation document, desktop publishing document, or so forth. The illustrated user terminal 10 is a portable computer, such as a laptop computer, executing software such as word processing software, spreadsheet software, presentation editing software, desktop publishing software, or so forth, that is suitable for preparing the document. Instead of the illustrated laptop computer 10, the user terminal can be a network terminal, workstation, personal computer having a wired or wireless network connection, personal data assistant, cellphone, or so forth running suitable software. The user terminal may include various input devices such as a keyboard, pointer touchpad, mouse, trackball, or so forth, and various output devices such as a video display, audio speakers, indicator lamps, or so forth. The user elects to print the document or a portion thereof, and the software executing on the user terminal 10 creates a print job. The user also selects a destination printing device 12 accessible from the user terminal 10 via a digital network such as the Internet 14. The illustrated printing device 12 is a multi-function printer typically including printing, copying, facsimile, scanning, and/or other functional capabilities. In other embodiments, the printing device may be a more basic printer with a single marking engine providing only printing capabilities, or may be a more sophisticated printer including, for example, a print station controller that drives one or more local marking engines and providing a plurality of different sheet processing pathways and capabilities.

The printing device 12 is typically located away from the user terminal 10. In FIG. 1, the user terminal 10 is operatively connected with the Internet 14 via an access point 15 of a wireless Internet service such a WiFi service, WLAN connection, broadband wireless Internet service, or so forth. While the wireless access point 15 is drawn connected with the Internet 14 in FIG. 1 for simplicity, it is to be appreciated that typically there may be intervening physical and/or software elements such as a server computer, a WLAN network, a firewall, or so forth operatively disposed between with the access point 15 and the Internet 14. The printing device 12 is connected with the Internet 14 by a wired connection 16, as illustrated, or by a wireless Internet service such as a WLAN. Again, there typically may be intervening physical and/or software elements (not shown) operatively disposed between the printing device 12 and the Internet 14. The printing device 12 may, for example, be located in a commercial print shop, a hotel, an airport, or so forth, and the laptop computer 10 is located substantially anywhere within range of the access point 15. Moreover, if the user terminal 10 is a laptop computer or other portable computer, then the user may carry the user terminal 10 about and such movement may occasionally cause the user terminal 10 to move out of range of the access point 15 and into range of another access point (not illustrated) which then picks up and maintains the wireless Internet session. While a wireless connection using the wireless access point 15 is illustrated for the laptop computer 10, it is to be appreciated that other network connections can be employed, including in some embodiments a wired network connection. For example, the user terminal may be a university computer laboratory computer connected with a wired university campus network, and the printing device may be one of a plurality of printing devices disposed at various locations around campus and accessible via the wired university campus network. Moreover, while the single example user terminal 10 is illustrated, typically a plurality of user terminals typically operated by various users are connectable with the printing device 12 to selectively send print jobs to the printing device 12 via the network 14 or other digital network. For example, the printing system 12 may be at a commercial print shop that serves many users.

The user is typically located at the user terminal 10 when the user generates the print job. Accordingly, if the print job were to immediately print, a security risk would present itself as someone other than the user could view the printed sheets before the user visits the printing device 12 and picks the sheets up, or alternatively before the sheets are collected and mailed, couriered, or otherwise delivered to the user. Similarly, if the print job is queued for later printing (for example, if the printing device 12 has a backlog of print jobs to process from the user and from other users) then the user may again be elsewhere when the printing device 12 prints the print job. Another issue which may arise is selection of a printing device. If the user is operating in an unfamiliar hotspot, he or she may be unaware of the identities, locations, and capabilities of available printing devices. In one approach, a captive portal or other mechanism provides the user with identification of available printing devices, for example using a user-friendly format such as a picture, location, map, context, or other format. In another approach, the user sends the print job to a central spooler without initially deciding upon a printing device. Once the user chooses a printing device he or she walks to the chosen printing device and pulls the print job as described herein.

Moreover, there is the issue of accounting. When printing using a hotel printing device, airport printing device, a printing device located at a print shop, or so forth, the user will generally be expected to pay the cost of printing. To protect against uncompensated usage of the printing device, the cost of printing should be accounted for at the time of printing on a per-page or other usage-based fee framework. On the other hand, to protect the user from paying for services not rendered in the event that the print job does not execute due to equipment failure, overloading of the printing device, exhaustion of toner or another consumable of the printing device, or so forth, the cost of printing should not be accounted for until the print job actually executes.

To address these concerns, a mobile device 20 is operatively connected with the user terminal 10 during creation of the print job, and stores certain information generated in conjunction with the print job. The mobile device 20 is then operatively disconnected from the user terminal 10 and is operatively connected with the printing device 12. The printing device retrieves the print job-related information stored on the mobile device 20 and executes the print job, including accounting for the printing cost, based on the retrieved print job-related information.

The illustrated mobile device is a USB drive 20. However, in other embodiments the mobile device may be a memory card connected to a card-specific port of the computer, or a digital music player including non-volatile storage, or a personal data assistant (PDA), or a cellular telephone, or so forth. By "non-volatile storage" it is meant that the mobile device can store data and can retain the stored data when it is operatively disconnected from the user terminal 10. The USB drive 20 is a removable drive that is connected to the laptop computer 10 via one of a plurality of Universal Serial Bus (USB) ports 22 and, once connected, appears to the computer as a drive operatively similar to a hard disk drive, floppy disk drive, optical disk, or other storage drive. While the user terminal 10 includes three illustrated USB ports 22, the number of USB ports on the user terminal can be one, two, three, four, or more. The illustrated USB drive 20 is a USB drive which employs non-volatile flash memory storage or other solid state memory storage. In other embodiments, the USB drive may be a USB hard disk drive which employs a USB connector and rotating magnetic disk storage, an MP3 or other music player that includes a USB connector and non-volatile storage, or so forth. In some embodiments, the non-volatile storage may be a CMOS memory that is kept non-volatile by being powered by an on-board battery or other energy storage device disposed on or in the mobile device. If the mobile device is equipped with another type of connector instead of a USB connector, then the user terminal should include a compatible mobile device connector other than or in addition to the illustrated USB ports 22. For example, if the mobile device is a digital camera memory card, then the mobile device connector is suitably a memory card slot. In other embodiments, the mobile device may be a personal data assistant (PDA), cellular telephone, or other mobile device that is operatively connected with the user terminal 10 via a short-range wireless connection such as a Bluetooth or Near Field Communications (NFC) connection.

With particular reference to FIGS. 1 and 2, at the time the user creates and sends the print job, the USB drive 20 is connected to one of the USB ports 22 of the user terminal 10, as illustrated in FIG. 2. That is, the mobile device is operatively connected with the user terminal. A print driver 28 comprises instructions executing on the user terminal 10 as illustrated, or on another processor connected with the network 14, that generate page description language (PDL) data corresponding to the print job and describing content layout of one or more pages to be printed. The PDL data describes the layout of each page of graphics, text, or other content to be printed. In some embodiments, the PDL data is Postscript data. In some embodiments, the PDL data is HPGL data, PCL data, or another standard PDL format. It is also contemplated for the PDL data to be in a lower-level format, such as rastered bitmap data. In some embodiments in which the printing device 12 uses a non-standard data format, the print driver 28 may be downloaded from a website associated with the printing device 12 or from a website associated with the manufacturer of the printing device 12 or from another support website. Rather than downloading an entire print driver, in some embodiments only configuration parameters for an already loaded print driver are downloaded, and the print driver is suitably configured.

In conventional printing, the PDL data is sent from the user terminal to the printing device, and the printing device operates its marking engine in accordance with the PDL data to produce printed sheets. If the printing device has a backlog, then the PDL data is stored or buffered at the printing device or elsewhere in the network until the printing device can perform the printing. However, this conventional printing raises certain security concerns, including potential production of the printed pages when the user is not present, and transmission and temporary storage of the unencrypted PDL data at the printing device or at another temporary storage connected with the network. Moreover, this approach can raise accounting concerns in settings in which the user is expected to pay for the printing on a per-sheet, per-print job, or other usage basis.

To address these concerns and others, an envelope generator 30 comprises instructions executing on the user terminal 10 as illustrated, or on another processor connected with the network 14, that decompose the print job into an incomplete print job envelope 32 that the envelope generator 30 sends to the printing device 12 via the wireless access point 15 and Internet 14 or other digital network, and completing data 34 that the envelope generator 30 stores on the mobile device 20. Optionally, some or all data of the incomplete print job envelope 32 is encrypted, and user credentials 36 assigned to the user or to the mobile device 20 by a certificate authority 38 and stored on the mobile device 20 is usable to decrypt the encrypted data. For example, the user credentials 36 may be used to create a public/private session key pair, the incomplete print job envelope 32 encrypted using the public session key, and the private session key needed for decryption stored as part of the completing data 34 on the mobile device 20. Similarly, the completing data 34 may also optionally be encrypted using a password-based encryption or so forth.

The incomplete print job envelope 32 that is sent to the printing system 12 via the wireless access point 15 and the Internet 14 or other digital network is incomplete in that it cannot be printed by the printing system 12 in the absence of the completing data 34 stored on the mobile device 20. In some embodiments, the incomplete print job envelope 32 is encrypted and cannot be decrypted without the user credentials 36 or other key or keys stored on the mobile device 20; hence, the incomplete print job envelope 32 cannot be printed without the completing information 34 including the decryption key or keys stored on the mobile device 20. In some embodiments, the incomplete print job envelope 32 incorporates less than all of the PDL data, and the completing data 34 incorporates at least a completing portion of the PDL data that is omitted from the incomplete print job envelope 32. Since the incomplete print job envelope 32 is missing some of the PDL data, the incomplete print job envelope 32 cannot be printed without the completing information 34 including the missing PDL data. In some embodiments, both encryption and splitting of the PDL data between the incomplete print job envelope 32 and the completing data 34 are used to ensure that the incomplete print job envelope 32 cannot be printed without the completing information 34 stored on the mobile device 20. Accordingly, the incomplete print job envelope 32 sent to the printing system 12 via the network 14 is stored in an internal buffer of the printing system 12 or in a spooler 39 or other buffer accessible to the printing system 12 via the network 14.

Additionally, print job accounting information 40 is generated by a user terminal accountant program 41 executing on the user terminal 10, and is stored on the mobile device 20. Although the print job accounting information 40 is shown in FIG. 1 as distinct from the completing data 34, the print job accounting information 40 can be viewed as a portion of the completing data 34 insofar as the incomplete print job envelope 32 cannot be printed without proper accounting, which is provided for by the print job accounting information 40. In some embodiments, the completing data 34 and print job accounting information 40 are combined as a single file or data structure. In some embodiments, the print job accounting information 40 is the entire set of completing data; that is, in such embodiments the print job accounting information 40 is provided but the remaining completing data 34 is omitted. The print job accounting information 40 provides information sufficient to account for the cost of printing the print job at the printing device 12. The print job accounting information 40 may include, for example, identification of a user account 42 and a password or other authorization information sufficient for the printing device 12 to make authorized withdrawals from the user account 42 to pay the cost of printing. The user account 42 may be, for example, a pre-paid user account having a monetary balance from which the cost of printing in monetary units can be deducted. In other embodiments, the user account 42 may be a credit card account to which the cost of printing is charged. In other embodiments, the user account 42 is a non-monetary account. For example, the user account 42 may be a pre-paid wireless Internet connection time allocation which provides the user with a pre-paid amount of Internet access time by the wireless Internet service provider operating the access point 15. In such embodiments, the cost of printing the print job is converted to a connection time equivalent for the deduction. For example, the cost of each printed sheet may correspond to two minutes of Internet access time, in which case two minutes are deducted from the pre-paid wireless Internet connection time allocation for each sheet printed. In some embodiments, the Internet connection time equivalent for a printed page may depend upon the type or other aspect of the printed page. For example, a black-and-white page may cost less Internet time than a color page, or the Internet time per page may depend upon other content aspects such as black-and-white versus low color coverage versus high color coverage, or so forth. In some embodiments, the user account 42 may be a user sheet allocation. In such embodiments, the cost of printing the print job is quantified by the number of printed sheets, which number is deducted from the user sheet allocation. Such an embodiment may be suitable, for example, in a university setting in which each student is allocated a certain number of sheets for printing each semester, which can be used on any printing device on the university campus network.

In addition to user account identity and access authorization, the print job accounting information 40 may include other useful accounting-related information. For example, the print job accounting information 40 may include an estimate of the total cost of the print job, which is optionally displayed to the user by the user terminal 10 prior to sending the incomplete print job envelope 32 to the printing device 12. In this way, the user can confirm or, if desired, cancel the print job based on the user's assessment of the reasonableness of the cost. Additionally, the print job accounting information 40 may include confirmation that the user account 42 has sufficient funds to pay for execution of the print job. To do this, the user terminal accountant 41 accesses the user account 42 via the wireless access point 15 and Internet 14, and makes a check of the account balance. To provide security for the user account 42, this check may involve providing the user credentials 36 to verify that the funds check is authorized by the user. Still further, the print job accounting information 40 may include information for performing the accounting, such as a connection time-sheet cost equivalency factor in embodiments in which the user account 42 is a pre-paid wireless Internet connection time allocation. Similarly, the print job accounting information 40 may include a page cost quotation supplied to the user terminal 10 from the printing device 12 at the time the print job is created. This optional information enables the user to "lock-in" a page cost at the time the print job is created and sent to the printing device 12, so as to insulate against any page cost increases that may occur between the time of sending the print job and the time the print job is executed at the printing device 12.

If the print job accounting information 40 includes a user account identification, then security of this account information becomes an issue. Accordingly, the print job accounting information 40 is optionally encrypted, for example using the user credentials 36. Similarly, to ensure that the user account is valid and that the deductions or print cost charges are authorized, the print job accounting information 40 is optionally digitally signed using the user credentials 36. Optionally, the print job accounting information 40 is encrypted using the public key of the printing device 12 (this can be in addition to, or instead of, encrypting using a user-based key), so that the print job accounting information 40 is accessible only by the printing device 12 using the private key of the printing device.

In order to cause the printing system 12 to execute the print job, the user disconnects the USB drive 20 from the USB port 22 or otherwise operatively disconnects the mobile device from the user terminal 10, and carries it along a physical path P from the user terminal 10 to the printing system 12 (path diagrammatically indicated by a dashed connector in FIG. 1, but to be understood as including any suitable path which may include any number of diversions such as a lunchroom visit, restroom break, or so forth). At the printing device 12, the mobile device 20 is operatively connected with the printing device 12, in the illustrated example by connecting the USB drive 20 with a USB port 44 of the printing device 12 as shown in FIG. 3. While the illustrated printing system 12 includes the single illustrated USB port 44, the number of USB ports can be one, two, three, four, or more. If the mobile device is equipped with another type of connector instead of a USB connector, then the printing system should include a compatible mobile device connector other than or in addition to the illustrated USB ports 22. For example, if the mobile device is a digital camera memory card, then the mobile device connector is suitably a memory card slot. In the case of a PDA, cellular telephone, or other mobile device that is operatively connected using Bluetooth or another short-range wireless communication protocol, the appropriate short-range wireless communication link is established, optionally automatically or optionally by suitable user inputs entered into the mobile device and/or the printing device.

Because the USB drive 20 or other mobile device has the completing data 34 stored in non-volatile memory, the completing data 34 remains stored on the mobile device when it is carried along the physical path P and is available to the printing system 12 upon operative connection of the mobile device 20 with the printing system 12. Moreover, the operative connection of the mobile device 20 with the printing system 12 by a physical connection or short-range wireless link provides assurance that the user is physically present at the printing system 12 at the time the operative connection is made. That is, the printing is a "pull" type printing in which the user triggers print job retrieval and execution at the end point, that is, at the printing device 12.

A print job reconstructor 46 executes on the printing system 12 or on another processor communicating with the printing system 12 via the network 14 or via another type of communication interface between the processor and the printing system 12. Operation of the print job reconstructor 46 can be initiated either by automatic detection of the mobile device 20 (for example, by an auto mount procedure operative on the USB port 44 in the case of the illustrated USB drive 20, or in response to the printing device detecting a wireless mobile device by Bluetooth polling, or so forth) or by user initiation (for example by user operation a touch-screen LCD display 48 or other user interfacing component of the printing system 12, or by user operation of an input of the mobile device such as a keypad of a PDA mobile device). The print job reconstructor 46 receives the incomplete print job envelope 32 and the completing data 34 and reconstructs the PDL data of the print job. If the incomplete print job envelope 32 is partially or wholly encrypted, then the reconstruction performed by the print job reconstructor 46 includes decrypting the data of the incomplete print job envelope 32 using the decryption key or keys recovered from the completing data 34. If the PDL data is split between the incomplete print job envelope 32 and the completing data 34 stored on the mobile device 20, then the print job reconstructor 46 recombines the split PDL data. The complete unencrypted PDL data is not available at the printing system 12 until after the user operatively connects the mobile device 20 with the printing system 12 and the print job reconstructor 46 reconstructs the unencrypted complete PDL data of the print job. Once the reconstruction is complete, the printing system 12 processes the PDL data to execute the print job. For example, if the PDL data is in Postscript, HPGL, PCL, or like format, then the printing system 12 rasters the PDL to generate rastered data for driving one or more marking engines to mark sheets of paper or another print medium. The reconstruction and rastering or other PDL data processing is typically relatively rapid, and so the sheets are printed relatively soon after the user operatively connects the mobile device 20 and optionally selects to execute the print job. Thus, assurance is provided that the user is physically present at the printing system 12 when the printed sheets are produced.

In some embodiments, it is contemplated for the incomplete print job envelope to be unencrypted and to include all PDL data for the print job, but to be incomplete in that the printing system is configured to not execute the print job until it receives completing data in the form of a print authorization token that is stored on the USB drive. The print authorization token may, for example, be a portion or all of the print job accounting information 40, in which case the completing data element 34 of FIG. 1 is suitably omitted. In these embodiments, the incomplete print job envelope is incomplete in that the printing system is configured to not execute the print job until it receives suitable print job accounting information 40. These embodiments provide assurance that the user is physically present at the printing system 12 when the printed sheets are produced, since the user has connected the USB drive storing the print authorization token, and further ensure proper accounting of the cost of printing. However, these embodiments that employ neither encryption of the incomplete print job envelope nor data splitting between the incomplete print job envelope and the mobile device provide substantially no protection against security breaches of the incomplete print job envelope while it is temporarily stored at the printing device or elsewhere queued. In the illustrated embodiments, encryption and/or data splitting is employed to enhance security of the incomplete print job envelope 32 during transit through the network 14 and during temporary storage at the printing system 12 or elsewhere.

It is also desired to properly account for the cost of printing. Accordingly, a printing device accountant 49 applies the cost of printing to the user account 42 based on the print job accounting information 40 stored on the mobile device 20. To do this, the printing device accountant 49 may need to gain access to the user account 42 using the user credentials 36 and/or authorization information stored in the print job accounting information 40. To ensure that the user is not charged for portions of the print job that fail to execute due to operational failure of the printing device 12, the printing device accountant 49 optionally applies the cost of each printed sheet substantially concurrently with the printing of the sheet. Other operations optionally performed by the printing device accountant 49 may include, for example, verifying sufficiency of funds (or their equivalent, such as pre-paid Internet connect time allocation, page allocation, credit card charge limit, or so forth) in the user account 42 prior to printing, or generating a digitally signed receipt indicating the cost of printing, which digital receipt is suitably digitally signed using at least a user's certificate of the user credentials 36 stored on the mobile device 20.

Figure 4:
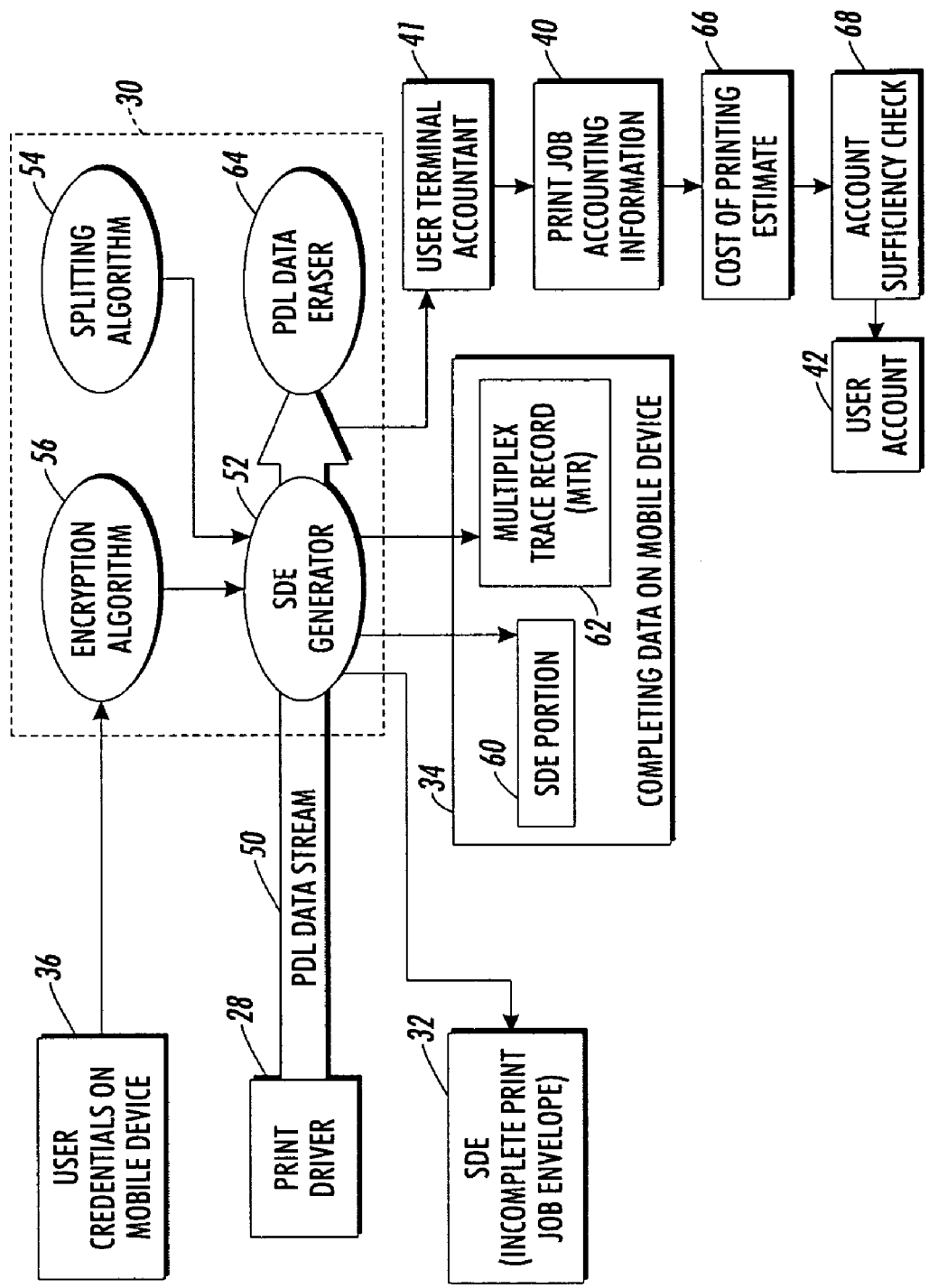
FIG. 4 diagrammatically shows the envelope generator and user terminal accountant of the user terminal and related elements.

With reference to FIG. 4, some example embodiments of the envelope generator 30 that employ encryption and data splitting, and of the user terminal accountant 41, are described. The print driver 28 produces a PDL data stream 50 that is input to the envelope generator 30. A secure document envelope generator 52 splits the PDL data in accordance with a splitting algorithm 54 into portions divided between the incomplete print job envelope 32 and the completing data 34 and encrypts each portion in accordance with an encryption algorithm 56. The encrypted PDL data portion or portions assigned to the incomplete print job envelope 32 are stored as a secure document envelope (denoted SDE, where "document" may refer to a printed portion of a word processing or other document). The encrypted PDL data portion or portions assigned to the completing data 34 are stored as a second SDE 60. In some embodiments, the splitting algorithm 54 splits the data with at least about 60% of the PDL data going into the incomplete print job envelope 32 and less than or about 40% of the PDL data going into the completing data 34. In some embodiments, the splitting algorithm 54 splits the data with at least about 90% of the PDL data going into the incomplete print job envelope 32 and less than or about 10% of the PDL data going into the completing data 34. For enhanced security, the splitting algorithm 54 may split the PDL data into non-contiguous portions, for example using a random or pseudo-random selection process. In such embodiments, a multiplex trace record 62 is also stored as part of the completing data 34. The multiplex trace record 62 indicates how the PDL data is split up, so as to enable subsequent reconstruction by the print job reconstructor 46 of the printing system 12. Optionally, the multiplex trace record 62, the SDE 60, or another portion of the completing data 34 also includes a decryption key, user-entered password, or other data to be used for decrypting the PDL data of the incomplete print job envelope 32. To further enhance security, the encryption performed by the SDE generator 52 is optionally performed piecemeal (for example, by separately encrypting each non-contiguous PDL data portion stored in the incomplete print job envelope 32) and a PDL data eraser 64 deletes or overwrites the PDL data after encryption. The two SDE portions 32, 60 are suitably associated with each other by a digitally signed serial number or identifier which is embedded in the portions.

Additionally, the user terminal accountant 41 constructs the print job accounting information 40. Typically, the user terminal accountant 41 will estimate a cost of printing 66 which is used by an account sufficiency check 68 to check whether sufficient funds are available in the user account 42, and/or is used to notify the user of the estimated print job cost via the user terminal 10. The cost of printing 66 is suitably estimated from the PDL data stream 50, for example using a fixed price-per-sheet to be printed or using a more complex cost formula taking into account the type of printing (for example, color pages may cost more than black-and-white pages), the type of print media (for example, sheets to be printed on heavy-bond paper may cost more than sheets to be printed on lighter-weight paper), the usage of consumables (for example, the sheet cost may be dependent upon the marking page fill-fraction since this affects how much toner or ink is used to print the sheet), or so forth. The cost of printing estimate 66 is an estimate at least in that the print job may fail to execute (in which case there will be no actual printing and hence no actual cost of printing). Additionally, the parameters used in computing the estimate 66, such as the per-page printing cost, may or may not be known with certainty at the time the print job is created.

In some embodiments, the cost of printing estimate 66 may be omitted. For example, the user may wish to create the print job without yet knowing which printing device will be used for the printing. In such a case, the incomplete print job envelope 32 is suitably stored on the user terminal 10 or another accessible storage until a printer is selected, and the print job accounting information 40 may include limited information such as identity and authorization information for the user account 42. Another instance in which the cost of printing estimate 66 may be omitted is the situation in which the user terminal 10 does not have sufficient information to make a meaningful estimate of the cost of printing. For example, the user terminal 10 may not know a cost-per-page factor needed to estimate the printing cost.

Figure 5:
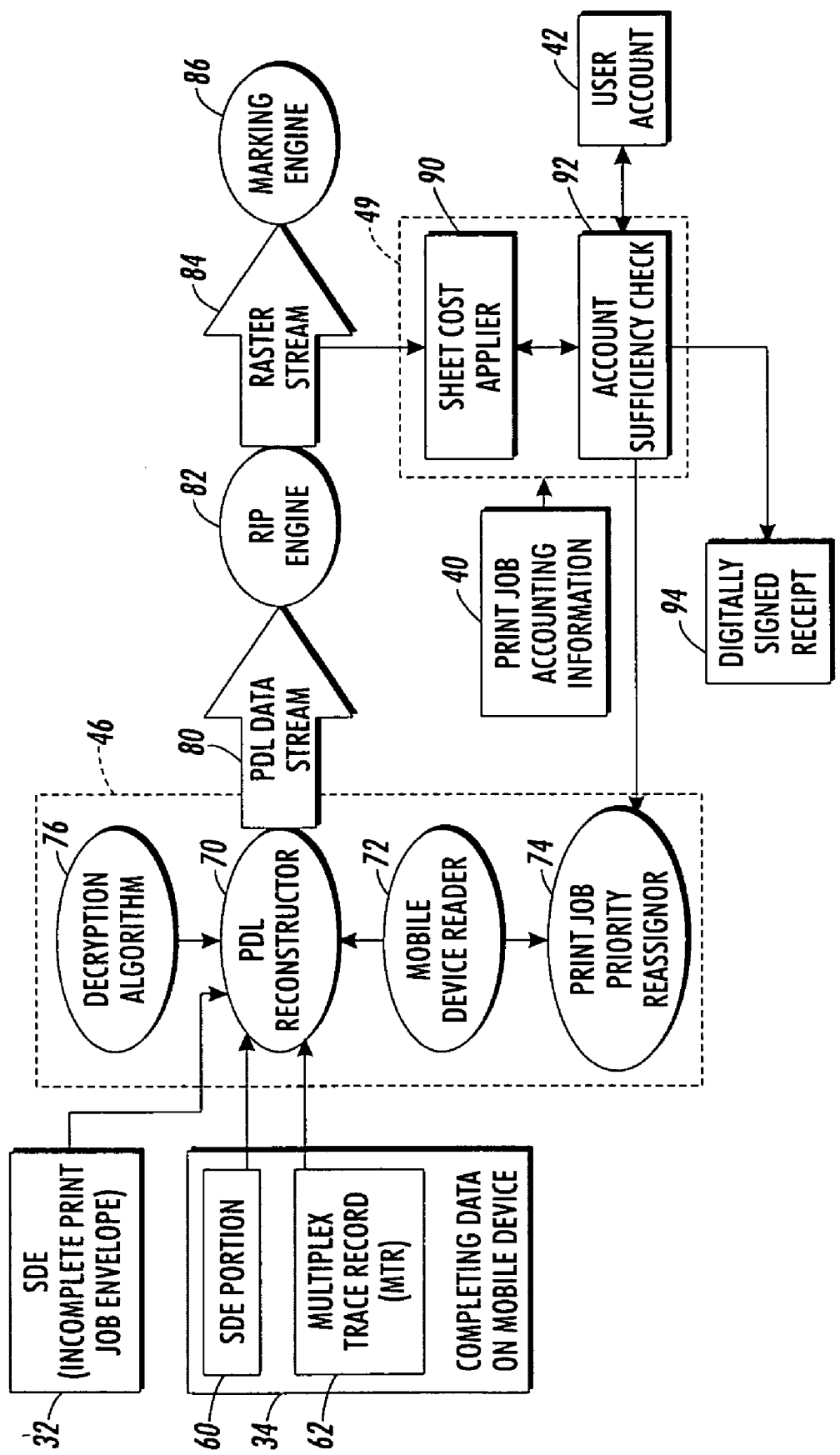
FIG. 5 diagrammatically shows the print job reconstructor and printing device accountant of the printing device and related elements.

With reference to FIGS. 5 and 6, some example embodiments of the print job reconstructor 46 and the printing device accountant 49 are described. A PDL reconstructor 70 reconstructs the PDL data from the SDE of the incomplete print job envelope 32 and the completing SDE portion of the completing data 34. The PDL reconstructor 70 is initiated automatically or by user input selection after operative connection of the mobile device 20 with the printing device 12. A mobile device reader 72 identifies the completing data 34 and associates it with the queued incomplete print job envelope 32. In some cases, the completing data for more than one print job may reside on the mobile device 20. To address such a situation, the user optionally selects the print job to be executed from a lists of print jobs shown (see example FIG. 6) on the touch-screen LCD display 48 of the printing system 12. Optionally, the mobile device reader 72 or the user selection from the list of FIG. 6 activates a print jobs priority reassign or 74 that assigns highest print priority to the print job selected for execution. That way, even if the printing system 12 has earlier-queued jobs (which may, for example, be unsecured print jobs configured to print on a first-in-first-out basis) the selected print job of the operatively connected mobile device 20 will take priority so that the user does not have to wait for the secured print jobs to be executed.

The PDL reconstructor 70 employs a decryption algorithm 76 to decrypt the PDL portions of the SDE of the incomplete print job envelope 32 and the completing SDE portion of the completing data 34. The decryption algorithm 76 suitably employs a decryption key or keys stored as part of the completing data 34 on the mobile device 20, or requests the user to enter a decryption password via the touch-screen LCD display 48, or employs a combination of decryption key and password protection. The decryption algorithm 76 is typically implemented as software executing on a processor or controller of the printing device 12; however, it is also contemplated to embody the decryption algorithm 76 partly or wholly as hardware of the printing device 12, for example as a decryption application-specific integrated circuit (ASIC). The output of the PDL reconstructor 70 is a PDL data stream 80 which should correspond to the PDL data stream 50 output by the print driver 28 (see FIG. 4). The PDL data stream 50 is processed by a raster image processing (RIP) engine 82 to produce a raster stream 84 that serves as input to one or more marking engines 86 of the printing device 12 that mark sheets of print media in accordance with the rasterized PDL data stream 80.

Additionally, the printing device accountant 49 performs accounting for the cost of printing of the executing print job based on the print job accounting information 40 stored on the operatively connected mobile device 20. In a suitable per-page accounting approach that reduces a likelihood of accounting discrepancies in the event of a printer device malfunction or exhaustion of the funds of the user account 42, a sheet cost applier 90 of the printing device accountant 49 monitors the print stream, for example by monitoring the raster stream 84 as illustrated, or monitoring upstream at the PDL data stream 80, or monitoring downstream at the marking engine 86. The sheet cost applier 90 applies the cost of each sheet to the user account 42 when the data for that sheet enters the raster stream 84 or other monitored portion of the print stream. The cost of each sheet is applied, for example, by deducting the sheet cost from a pre-paid user account, or by charging a credit card account of the user. Monitoring the PDL data stream 80 or raster stream 84 enables accounting for the cost of each printed sheet substantially concurrently with the printing of the sheet—at most, a discrepancy of one or a few sheets may occur if the printing device 12 malfunctions between the time the sheet data enters the PDL data stream 80 or raster stream 84 and the time of actual sheet marking. Monitoring the marking engine 86 substantially eliminates the possibility of accounting discrepancies, since the sheet cost is applied only once the sheet marking is completed. To ensure that the user account 42 is not overdrawn, the printing device accountant 49 suitably includes an account sufficiency check 92 that checks the sufficiency of funds in the user account 42 prior to the beginning of the print job and optionally as each sheet is printed and accounted for. In some embodiments, the account sufficiency check 92 triggers the print job priority reassignor 74 to initiate the print job once it determines that the user account 42 has sufficient funds to pay for the complete print job.

In some embodiments, the print job accounting information 40 includes a lifetime value for the print job. If the print job is not executed within the time specified by the lifetime value, then the print job expires and the incomplete print job envelope 32 is deleted from the print queue. In such embodiments, the printing device accountant 49 verifies that the lifetime value is satisfied before allowing print execution to continue. In some embodiments, the lifetime value is also linked and related with the issued certificate's validity period.

Optionally, the printing device accountant 49 further logs the cost of printing digitally signed using a user's certificate of the user credentials 36 and a certificate of the printing device 12. This ensures that the logging is verified by both parties: the user and the printing device. In other embodiments, the printing device accountant 49 produces a receipt 94 indicating the cost of printing that is digitally signed using the user's certificate, and optionally also using the printing device's certificate.

With returning reference to FIG. 1, in some embodiments the incomplete print job envelope 32 is sent to the spooler 39 rather than directly to the printing device 12. The spooler 39 performs optional pre-processing, such as: (i) re-checking the user's credit availability (such as the sufficiency of the user account 42) and giving clearance or discarding the job based on this credit check; (ii) digitally signing the incomplete print job envelope 32 as "verified"; (iii) spooling the incomplete print job envelope 32 to the printing device 12, thus allowing the printing device 12 to have a smaller print queue. The use of the intermediate spooler 39 advantageously can mitigate the effectiveness of Denial of Service (DOS) attacks by employing filtering rules such as accepting only jobs carrying a suitable clearance or verification signature. Also, as the user may take a few minutes, a few hours, or perhaps even days to come to the printer, the spooler 39 avoids extended queuing of the incomplete print job envelope 32 in the queue of the printing device 12, thus allowing the printing device queue to handle other print jobs on a first-in-first-out or other prioritization basis. In some embodiments, the incomplete print job envelope 32 may be generated before the user has selected a printing device, and may be suitably queued at the spooler 39. The user can then forward the incomplete print job envelope 32 to a printing device later selected, and indeed can do so from substantially any device capable of Internet connectivity, and not only from the user interface 10 used to create the incomplete print job envelope 32.

With returning reference to FIG. 1, locating of the printing device 12 may be an issue when the user is traveling with his or her laptop computer 10 in an unfamiliar city or other locale. In one suitable approach, a database 98 linking printers with access points is accessed by the user. For example, the database 98 may store distances between printing systems and access points, location classifications of printing systems and access points, or so forth. In some embodiments, the database 98 identifies printing devices that are geographically close to the access point 15, for example based on Global Positioning System (GPS) coordinates. In some embodiments, the database 98 identifies printing devices that are in the same environment as the access point 15, such as the in the same building, facility, or city as the access point 15. In some embodiments, the database 98 identifies or groups printing devices by other criteria, such as printing capabilities, page cost, finishing capabilities, or so forth. In some embodiments, the database 98 is a website on the Internet 14 that is accessed via the user terminal 10 by a uniform resource locator (URL) visited by the user employing a web browser. In some embodiments, the database 98 is accessed using a captive portal technique, in which the user is detected as an unauthenticated client and a generic Login web page is shown on the browser. In the captive portal technique, the Login web page is typically the only web page available and served to the user until a valid authentication process is accomplished and credentials are provided to the user. Optionally, the user may employ the database 98 to find a printing device near a location other than the location of the access point 15. For example, if the user is working at an airport while waiting for a flight, the user may elect to send the print job to a printing device at the destination airport or destination city, rather than a printing device in the departure airport or city containing the access point 15. This is an example of "pull printing" in which the user causes (or "pulls") retrieval and execution of the print job at the destination. As this example shows, pull printing provides advantages in terms of security, since the printed pages are not generated at the destination airport unless and until the user is actually at the location of the printing device at the destination airport, where the user can monitor printing and pick up the printed pages without delay. Pull printing also provides advantages in terms of accounting. The cost of printing is not deducted from the user's account (or credited to the user's credit account) until about the time that the page or print job is executed. In the previous example, if the user never arrives at the destination airport (for example, if the flight is re-routed) then the pages are never printed and the user is not charged for the cost of the never-executed print job.

A more detailed illustrative example of operation of the secured document printing is now provided. In this example, the PDL data is generated as a file on the user terminal 10.

Secured Document Envelope's skeleton building at the user's desktop. The SDE of the incomplete print job envelope 32 has a skeleton in which to place information about: job submitter, such as user name and public key; information about the printing system 12, such as device name, uniform resource indicator(URI) on the network 14, and the printing system's public key; information about the mobile device 20, such as device name or MAC address, device type (such as USB key) and the public key of the user credentials 36; and information about the document, such as the PDL data, encryption method information, and a sub-tree or other structural information about the encrypted elements including the document itself. The PDL data is chunked in accordance with the splitting algorithm 54 into two streams that are processed independently, and the multiplexing pattern is recorded in the multiplexing trace record 62. The first stream is encrypted using a first session key to generate the SDE 32 and spooled to the printing device 12, optionally via a print server, spooler 39, or other intermediary. The printing device 12 identifies the incoming job as a secure print request, suitably stores it in a "secure print" dedicated space, and registers it on the print queue with a suitable status field such as "Waiting for Release". Additionally, the printing system 12 optionally checks the validity of any certificates associated to the incomplete print job envelope 32, in order to verify that none of the certificates associated with the identities used to submit or release the job are in a certificate revocation list issued by the certificate authority 38. Optionally, the printing system 12 employs the Online Certificate Status Protocol to check certificates in real time. Certificate checking is advantageous so as to counteract possible man-in-the-middle attacks. The first session key is suitably stored in the multiplexing trace record 62. The second stream is encrypted using a second session key to produce the SDE portion 60 which is stored along with the multiplexing trace record 62 on the USB drive 20. Additionally, the user terminal accountant 41 generates the print job accounting information 40 based on information stored on the mobile device 20, based on responses to user queries, such as a query for a credit card number or other identifying information about the user account 42, and/or based on responses to queries conveyed over the Internet 14, such as a credit limit check request. Optionally, the print job accounting information 40 is encrypted using a suitable session key, or is integrated with and encrypted with the SDE portion 60 that is stored on the USB drive 20.

When the USB drive 20 is plugged into the USB port 44 of the printing system 12, the printing system 12 mounts the USB drive's file system-to make the storage volume and its contents visible to the operating system of the printing system 12. The printing'system 12 searches on the USB drive's file system to find user credentials 36 (for example, in the form of a digital certificate file), the completing data 34 bearing a serial number or identifier corresponding to the serial number or identifier of the incomplete print job envelope 32 that is queued on the printing device 12, and the print job accounting information 40. The printing device 12 then prompts the user to release the job (for example, using the display of FIG. 6), and then encrypts the session key of the incomplete print job envelope 32 asymmetrically with the private key of the USB drive 20 as well as the multiplexing trace record 62 and the SDE portion 60. During this stage the implementation proceeds with the decryption in accordance with the multiplexing trace record 62. Before executing the print job, the printing device 12 accesses the print job accounting information 40 and verifies that the user account 42 still has sufficient funds (in the case of a credit card account, this entails verifying that the account is not over its credit limit). The printing system 12 reads the multiplexing trace record 62 from the USB drive's file system, and decides whether the next portion has to be gathered from the SDE 32 available on its queue or from the SDE portion 60 on the USB drive's file system. The printing system 12 sequences chunks in the right order (given by the multiplexing trace record 62) and sends them to the raster image processing engine 82. Pages are printed one after the other and intermediate files are cleaned up. As each page is printed, the sheet cost applier 90 applies the cost to the user account 42 (deducts the page cost from a pre-paid account, or adds the page cost as a charge to a credit account). When print job execution is complete, the printing device accountant 49 optionally generates the digitally signed receipt 94. The user collects the printed pages and walks away. Once the printing is completed, the full encrypted document portion is removed from the storage of the printing system 12.

In some situations, the identity of the printing system may not be known ahead of time. For example, a small business may have its printing done at a commercial copy shop. The specific printing system is not known prior to printing. (Indeed, the user may not even know which print shop he or she will use). In this case, the process for generating the incomplete print job envelope 32 and completing information 34 is as set forth previously, with the addition that the incomplete print job envelope 32 is not directly spooled to the printer, but rather is spooled to an Internet-accessible location (for example, suitably represented in FIG. 1 by identifying the network 14 as the Internet and the spooler 39 as the Internet-accessible location.) The completing data 34 in this embodiment includes a URL to the Internet-accessible location and a pointer (such as a serial number, access code, or so forth) identifying the incomplete print job envelope 32. The user then goes to the print shop or other printing location and inserts the USB drive 20 into a USB port of the printer to pull the print job. The print job reconstructor of the printing system is configured to read the URL from the completing data 34 and go to the Internet-accessible location to download the incomplete print job envelope 32. The remaining reconstruction and accounting processing is as set forth previously.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing method comprising:

at a user terminal operatively connected with a mobile device, decomposing a print job into an incomplete print job envelope and completing data including at least print job accounting information;

storing the completing data including at least the print job accounting information on the mobile device;

transmitting the incomplete print job envelope to a printing device;

operatively disconnecting the mobile device from the user terminal;

operatively connecting the mobile device with the printing device;

after the operative connecting, re-constructing the print job at the printing device;

printing the re-constructed print job using the printing device; and accounting for a cost of the printing based on the print job accounting information stored on the operatively connected mobile device.

2. The printing method as set forth in claim 1, wherein the mobile device is one of (i) a removable USB drive having a USB port for operatively connecting with the user terminal and the printing device, and (ii) a short-range wireless device having short-range wireless communication capability for operatively connecting with the user terminal and the printing device.

3. The printing method as set forth in claim 1, wherein the decomposing comprises encrypting data of the incomplete print job envelope at the user terminal, and the-reconstructing comprises decrypting the encrypted data of the incomplete print job envelope at the printing device.

4. The printing method as set forth in claim 1, wherein the decomposing comprises incorporating digitally signed identifiers into the incomplete print job envelope and the completing data, and the reconstructing comprises associating the completing data and the incomplete print job envelope at the printing device based on the incorporated digitally signed identifiers.

5. The printing method as set forth in claim 1, wherein the decomposing comprises:
generating page description language (PDL) data corresponding to the print job and describing content layout of one or more pages to be printed;
incorporating into the incomplete print job envelope less than all of the PDL data;
incorporating into the completing data at least a completing portion of the PDL data that is omitted from the incomplete print job envelope.

6. The printing method as set forth in claim 1, wherein the decomposing comprises:
encrypting at least one of the incomplete print job envelope and the completing data based on user credential information stored on the mobile device.

7. The printing method as set forth in claim 1, wherein the transmitting of the incomplete print job envelope to the printing device comprises:
transmitting the incomplete print job envelope via a wireless Internet connection.

8. The printing method as set forth in claim 7, wherein the accounting comprises:
reducing a pre-paid wireless Internet connection time allocation by an amount corresponding to the cost of the printing.

9. The printing method as set forth in claim 7, wherein the accounting comprises:
reducing a sheet allocation by a number of sheets printed during the printing.

10. The printing method as set forth in claim 7, wherein the accounting comprises:
verifying that a user being charged for the cost of the printing has sufficient funds or credit to cover the cost of the printing, the printing being conditioned on successful verification.

11. The printing method as set forth in claim 10, wherein the verifying is performed based on user credentials stored on the mobile device.

12. The printing method as set forth in claim 7, further comprising:
at the user terminal, locating the device system based on (i) identity of an access point used in the wireless Internet connection and (ii) a database associating printing devices with access points of the wireless Internet connection.

13. The printing method as set forth in claim 1, wherein the accounting comprises:
accounting for the cost of each printed sheet concurrently with the printing of the sheet.

14. The printing method as set forth in claim 1, wherein the completing data includes a print job lifetime value and the accounting comprises:
verifying that the print job lifetime value is satisfied, the printing being conditioned on the print job lifetime value being satisfied.

15. The printing method as set forth in claim 1, further comprising:
at the user terminal, estimating the cost of the printing based on the print job accounting information; and
at the user terminal, providing a notification of the cost of the printing, the transmitting being conditioned upon an acceptance of the cost of the printing provided via the user terminal.

16. The printing method as set forth in claim 1, wherein the accounting comprises:
logging the cost of the printing, the logging being digitally signed using (i) a user's certificate stored on the mobile device and (ii) a certificate of the printing device.

17. The printing method as set forth in claim 1, wherein the accounting comprises:
generating a digitally signed receipt indicating the cost of the printing and digitally signed using at least a user's certificate stored on the mobile device.

18. The printing method as set forth in claim 1, further comprising:
aborting the printing conditional upon the mobile device operatively disconnecting from the printing device during the printing, the accounting not including the cost of the portion of the printing not performed due to the aborting.

19. A printing system comprising:
a printing device including a network connection operatively connected with a digital network and a mobile device interface for operatively connecting a mobile device including non-volatile storage;
a print job reconstructor that reconstructs a print job from an incomplete print job envelope responsive to receiving completing data including at least print job accounting information via the mobile device interface, the reconstructed print job being executed by the printing device; and
a printing device accountant that accounts for a cost of printing the reconstructed print job based at least on the print job accounting information.

20. The printing system as set forth in claim 19, wherein the printing device accountant applies the cost of printing the print job to a user account identified by the print job accounting information.

21. The printing system as set forth in claim 20, wherein the user account is selected from a group consisting of:
(i) a pre-paid user account having a monetary balance, the cost being deducted from said pre-paid user account,
(ii) a credit card account, the cost being charged to said credit card account,
(iii) a pre-paid wireless Internet connection time allocation, the cost being converted to a connection time equivalent that is deducted from said pre-paid wireless Internet connection time allocation, and
(iv) a user sheet allocation, the cost being quantified by a the number of printed sheets that is deducted from said user sheet allocation.

22. The printing system as set forth in claim 20, wherein the printing device accountant applies the cost of each printed sheet to the user account concurrently with the printing of the sheet.

23. A print job generator comprising:
- a user terminal operatively connectable with a digital network and operatively connectable with a mobile device;
- a print driver comprising instructions to generate page description language (PDL) data corresponding to a print job;
- an envelope generator comprising instructions to decompose the PDL data into an incomplete print job envelope sent to a printing device via the digital network and completing data that is stored on the mobile device, the incomplete print job envelope and the completing data being configured to enable reconstruction of the PDL data at the printing device responsive to the mobile device on which the completing data is stored being operatively connected with the printing device; and
- a print job accounting information generator comprising instructions to generate print job accounting information including at least an identity of a user account and authorization to access the user account, the print job accounting information being stored on the mobile device, the printing device accounting for a cost of printing the print job based on the print job accounting information stored on the mobile device.

24. The print job generator as set forth in claim 23, wherein the user terminal is a portable computer having wireless Internet connectivity, and the user account is a pre-paid user account or a credit account.

25. The print job generator as set forth in claim 23, wherein the print job accounting information generator encrypts the print job accounting information that is stored on the mobile device.

* * * * *